United States Patent
Pirdy (12)

(10) Patent No.: US 6,286,109 B1
(45) Date of Patent: Sep. 4, 2001

(54) METHOD AND APPARATUS FOR REDUCING HEAT GENERATION IN A PORTABLE COMPUTER

(75) Inventor: Scott L. Pirdy, Westboro, MA (US)

(73) Assignee: Digital Equipment Corporation, Maynard, MA (US)

( * ) Notice: Subject to any disclaimer, the term of this patent is extended or adjusted under 35 U.S.C. 154(b) by 0 days.

(21) Appl. No.: 09/107,648

(22) Filed: Jun. 30, 1998

(51) Int. Cl.[7] .................. G06F 1/26; G06F 1/28; G06F 1/30; G06F 11/30

(52) U.S. Cl. .................. 713/340; 320/106; 320/128; 320/132; 320/143; 320/150

(58) Field of Search ........................ 713/300–340; 320/106, 128, 134, 132, 150, 152, 143, 144, 145, 153

(56) References Cited

U.S. PATENT DOCUMENTS

| | | | |
|---|---|---|---|
| 5,557,188 | * | 9/1996 | Piercey .................. 320/5 |
| 5,583,417 | * | 12/1996 | Yuen .................. 320/22 |
| 5,592,070 | * | 1/1997 | Mino .................. 320/35 |
| 5,777,399 | * | 7/1998 | Shibuya .................. 307/66 |
| 5,900,717 | * | 5/1999 | Lee .................. 320/150 |

\* cited by examiner

*Primary Examiner*—Rupal Dharia
(74) *Attorney, Agent, or Firm*—Fletcher, Yoder & Van Someren

(57) ABSTRACT

A method and apparatus for controlling heat generation within a battery-powered portable computer. One aspect is directed to a computer including a battery, a battery charging circuit operatively connected to the battery to charge the battery at a charging rate, and a temperature detection and control circuit, coupled to the battery charging circuit, that detects a temperature within the computer and provides a control signal to the battery charging circuit having a control value based on the temperature detected. The battery charging circuit is responsive to the control value of the control signal to alter the charging rate. Another aspect is directed to a method for controlling heat dissipation within a portable electronic device having a battery and a battery charging circuit. The method includes steps of charging the battery at a charging rate, detecting a temperature within the portable electronic device, determining whether the temperature exceeds a reference value, and reducing the charging rate when the temperature exceeds the reference value.

19 Claims, 3 Drawing Sheets

METHOD AND APPARATUS FOR REDUCING HEAT GENERATION IN A PORTABLE COMPUTER

FIELD OF THE INVENTION

The present invention relates to a method and apparatus for reducing heat generation in a portable computer.

BACKGROUND OF THE INVENTION

Portable electronic devices, such as notebook computers, typically generate relatively large amounts of heat during normal operation. To prevent malfunctioning of these devices due to thermal overload, it is typically necessary to control the temperature at critical locations in the devices. In desktop computers, the problem of thermal control is more easily solved through the use of fans, cooling slots in the chassis, and relatively large heat sinks.

In battery-powered portable computers, it is undesirable to use fans because of their power consumption, acoustic and electrical noise, and physical size, and because of space limitations, it is undesirable to use cooling slots and large heat sinks. Typical portable computers therefore achieve thermal control through the careful layout of components, and by controlling power consumption. One of the primary ways in which power consumption is controlled is by reducing the frequency of clock signals within the central processing unit (CPU) of the portable computer. A 50% reduction in the frequency of the clock signals will typically reduce the CPU power consumption and heat generation by approximately 50%.

SUMMARY OF THE INVENTION

In one general aspect, the invention features a computer including a battery having a first terminal, a battery charging circuit having an output operatively connected to the first terminal of the battery and having a control input, and a temperature sensor responsive to temperature at a location within the computer and having a temperature indicating output operatively connected to the control input of the battery charging circuit.

The battery charging circuit can be responsive to a control value of the control signal to set a charging rate of the battery. The temperature sensor can be responsive to the temperature of computing circuitry within the computer. The battery charging circuit can be constructed and arranged to reduce a charging rate of the charging circuit when a temperature detected by the temperature sensor exceeds a reference value. A factor by which the charging rate is reduced can be based upon a magnitude of a difference between the temperature detected and the reference value. The battery charging circuit can reduce the charging rate by reducing a magnitude of charge current supplied to the battery. A pulse width of pulses contained within a control signal of the charging circuit can be used to determine the control value.

In another general aspect, the invention features a method for controlling heat dissipation within a portable electronic device having a battery and a battery charging circuit. The method includes steps of charging the battery at a charging rate, detecting a temperature of electronic components within the portable electronic device, determining whether the temperature exceeds a reference value, and reducing the charging rate when the temperature exceeds the reference value.

The determining step can include a step of determining a magnitude of a difference between the temperature detected and the reference value, and the step of reducing can include a step of reducing the charge rate by a factor based upon the magnitude of the difference between the temperature detected and the reference value. The step of reducing the charge rate can include a step of reducing a magnitude of a charge current from the charging circuit to the battery. The step of detecting can include a step of detecting a plurality of temperatures at a plurality of locations in the portable electronic device, and the step of determining can include a step of determining whether any of the plurality of temperatures exceeds a corresponding reference value. The method can further include a step of reducing a clock rate to components of the computer in response to a determination that the temperature exceeds a second reference value.

In another general aspect, the invention features a computer including a battery, means for charging the battery, means for detecting a temperature of at least one location within the computer, and means for reducing a charging rate of the means for charging when the temperature exceeds a reference value.

The means for reducing the charging rate can include means for reducing a magnitude of a charge current from the battery charger to the battery. The temperature detection circuit can be adapted to detect a plurality of temperatures at a plurality of locations in the computer, and wherein the means for reducing power consumption can include means for reducing power consumption when any of the plurality of temperatures exceeds a corresponding reference value.

Systems according to the invention may be advantageous in that they can permit more versatile temperature control of a personal computer. This may allow the computer to operate at a lower temperature, or within a more consistent temperature range. As a result, the mean time between failure of the components of the computer can be increased.

Systems according to the invention may also be advantageous in that they permit temperature control without reducing the computational performance of the computer. This can provide more computational power to the user, even in high temperature environments.

BRIEF DESCRIPTION OF THE DRAWINGS

For a better understanding of the present invention, reference is made to the drawings which are incorporated herein by reference and in which.

DETAILED DESCRIPTION

Embodiments of the present invention are described below with reference to a portable computer having a battery charging circuit with a charging rate that is controlled based on a value of a temperature within the portable computer. However, as understood by those skilled in the art, embodiments of the present invention are not limited to portable computers, but rather, include other battery-powered electronic devices.

Figure 1:
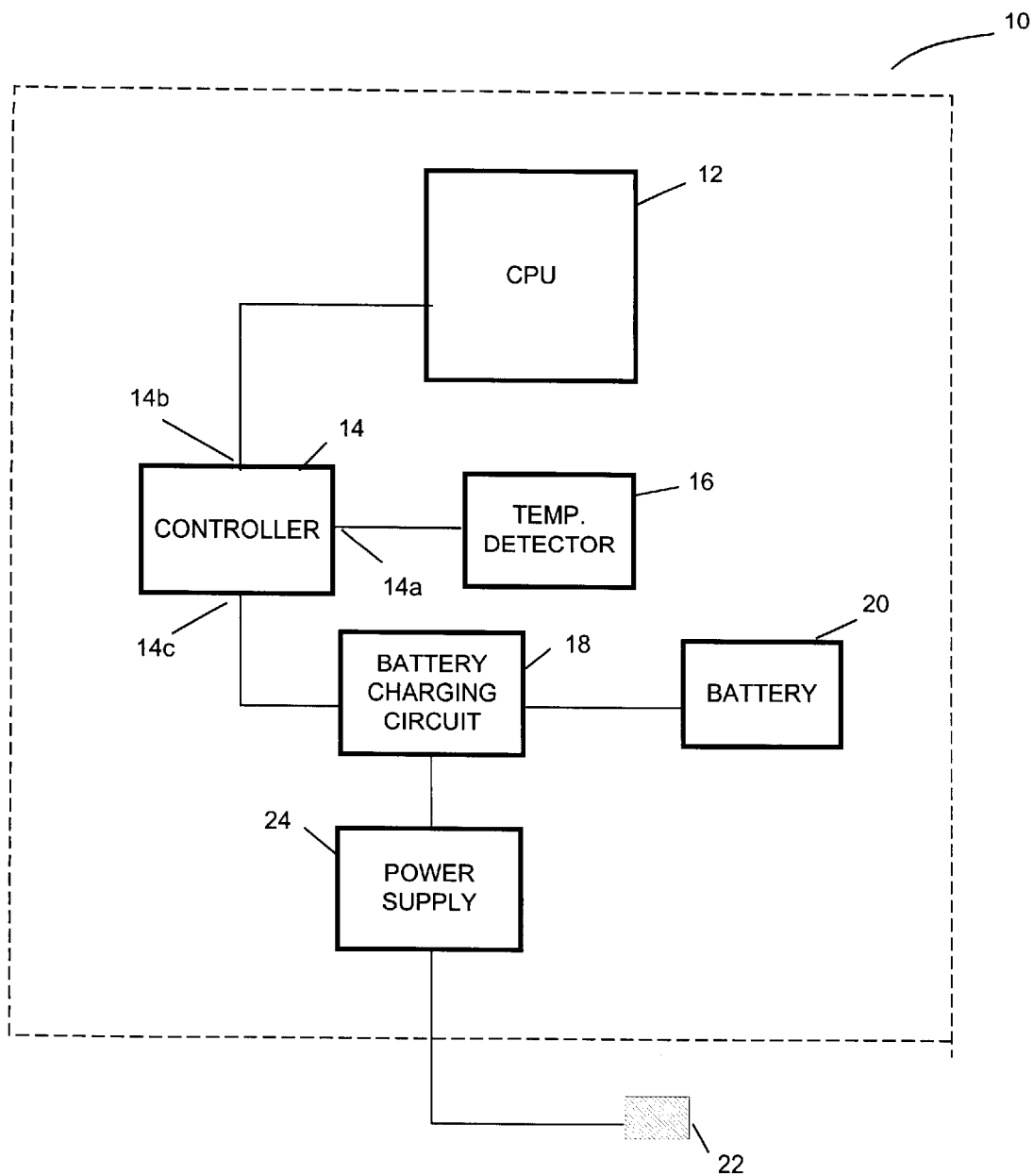
FIG. 1 is a block diagram of a portable computer in accordance with one embodiment of the present invention.

A block diagram of a portable computer 10 in accordance with one embodiment of the present invention is shown in FIG. 1. Many of the devices and interconnections contained within a typical portable computer are not shown in FIG. 1 for clarity. The portable computer 10 includes a central processing unit (CPU) 12, a controller 14 coupled to the CPU 12, a temperature detection circuit 16 coupled to the controller 14, a battery charging circuit 18 coupled to the controller 14, a power supply 24, and a battery 20 coupled to the battery charging circuit 18. The portable computer also includes an external AC/DC adapter 22 for coupling the portable computer to an external AC power source to allow the battery 20 to be charged from the external power source, and to allow operation of the portable computer from the external power source.

The CPU 12 contains the primary data processing circuitry of the portable computer. The controller 14 is an embedded controller that interfaces with the CPU and is used to perform several control functions within the portable computer 10, such as keyboard control, power management, battery management, and docking/device management in addition to controlling the battery charging circuit, as discussed below. The battery charging circuit 18 is used to charge the battery when the external AC/DC adapter 22 is coupled to an AC power source. The battery charging circuit 18 is capable of providing charging current to the battery when the portable computer is powered either on or off. The temperature detector 16 detects the temperature at one or more critical locations within the portable computer and provides an electrical signal to the controller indicating the value or values detected.

Figure 2:
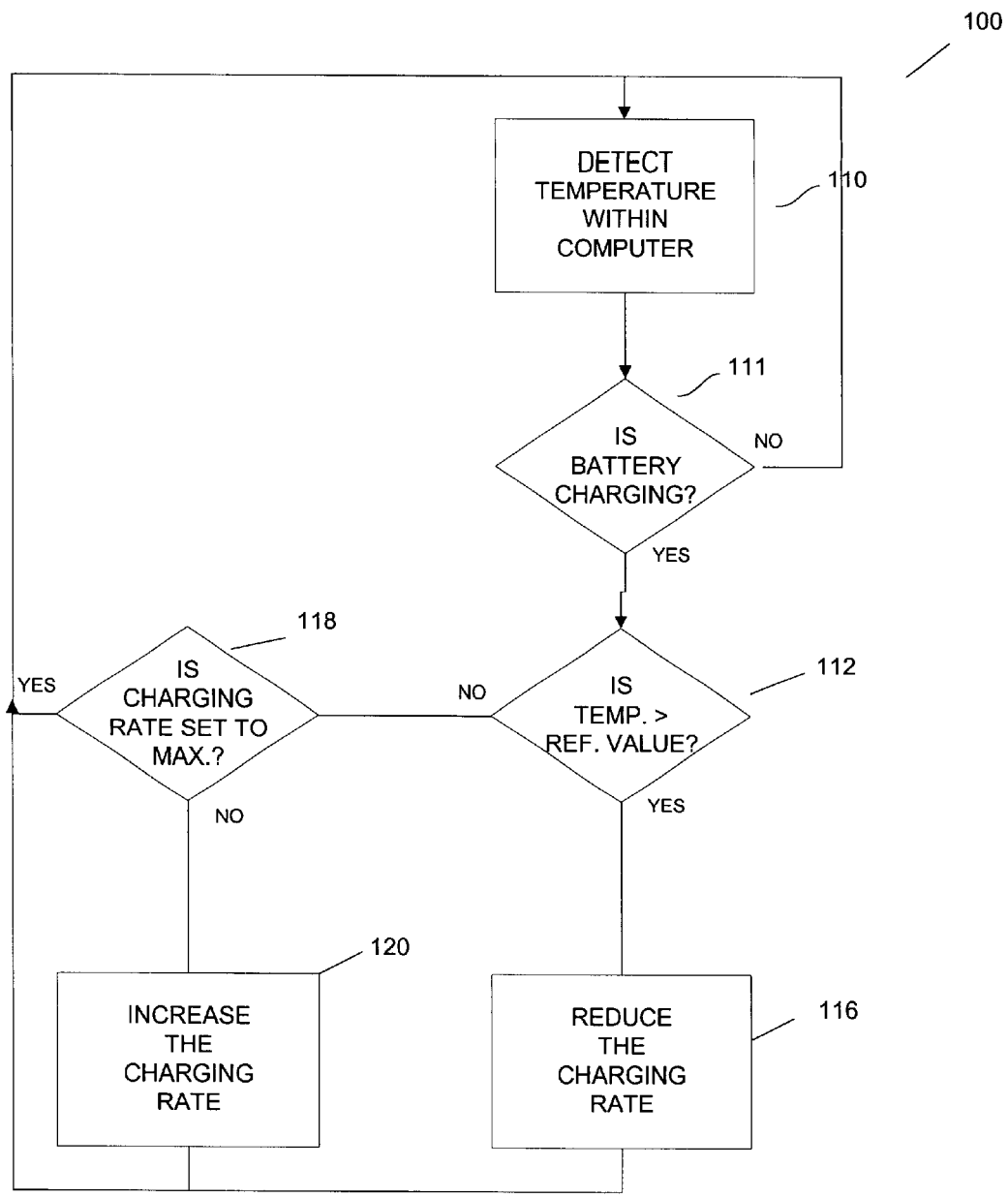
FIG. 2 is a flow chart of a method of controlling heat generation in the portable computer of FIG. 1.

The process 100 in accordance with one embodiment of the present invention by which the portable computer 10 controls power consumption to provide thermal management will now be described with reference to FIG. 2. In a first step 110 of the process, the temperature is detected at a position within the portable computer proximate the CPU. A determination is then made in decision block 111 as to whether the battery is presently being charged. If the outcome of decision block 111 is "No", then the process returns to step 110. If the outcome of decision block 111 is "Yes", then the process continues and the detected temperature is compared in step 112 with a preset reference value by the controller 14. If the detected temperature is greater than the preset reference value, then the controller signals the battery charging circuit to reduce the rate at which the battery is being charged, and in step 116, the battery charging circuit reduces the charging rate in response to the signal from the controller. The reduction in charging rate reduces the total power consumption by, and heat generated from, the battery charging circuit, thereby lowering the temperature within the portable computer.

If the detected temperature is less than the reference value in step 112, then in step 118 a determination is made as to whether the charge rate of the battery charger is set for the maximum rate. If the outcome of step 118 is "Yes" then the process returns to step 110. If the outcome of step 118 is "No", then the controller signals the battery charging circuit to increase the charging rate, and in step 120 the charging rate is increased. After steps 116 and 120, the process returns to step 110. In some embodiments of the invention, a delay may be inserted in the process after steps 116 and 120 before the process returns to step 110 to allow a change in temperature to occur in the portable computer.

In some embodiments of the present invention, the amount by which the charging rate is decreased (step 116) or increased (step 120) may be determined based on a magnitude of the difference between the detected temperature and the preset reference value.

Figure 3:
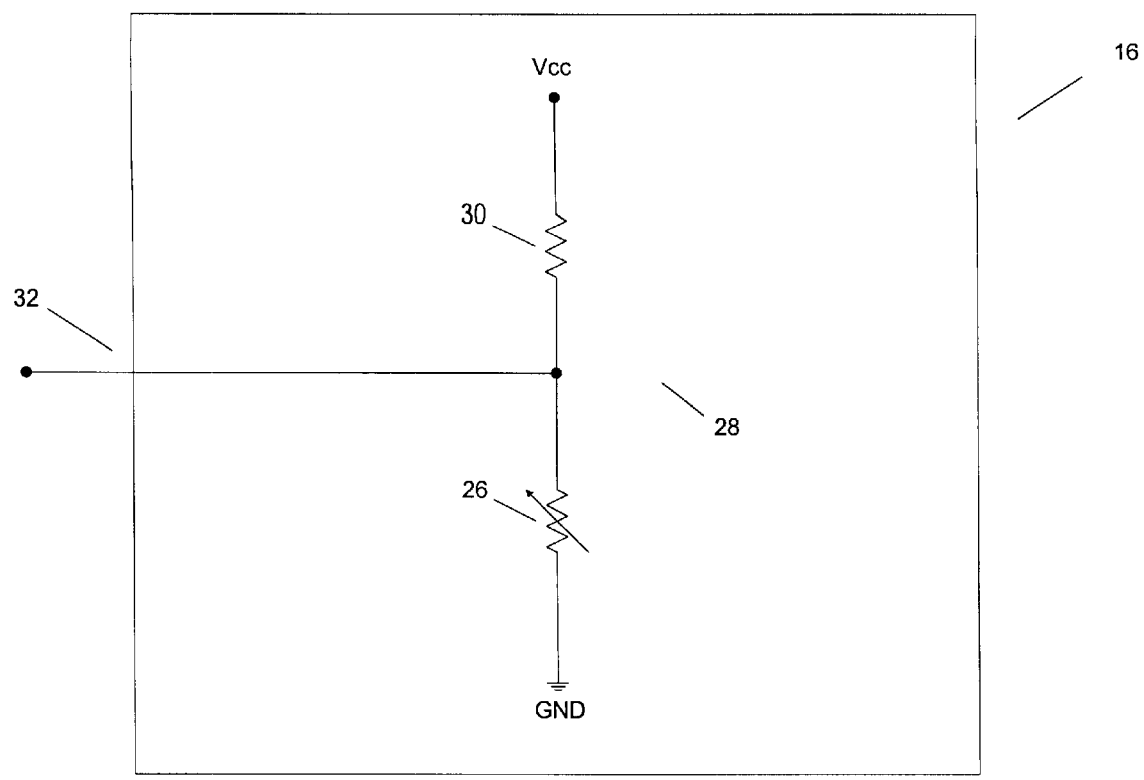
FIG. 3 is a schematic diagram showing in greater detail a temperature detector of the portable computer of FIG. 1.

In one embodiment of the present invention, the temperature detector is implemented using a thermistor 26 that is series-coupled in a voltage divider network 28 with a resistor 30. As shown in FIG. 3, the voltage divider network is coupled between a threshold voltage $V_T$ and a ground reference voltage GND. The temperature detector has an output 32, which as described above is coupled to the controller. The output 32 is coupled within the temperature detector to a midpoint in the voltage divider between the thermistor and the resistor.

The temperature detector operates as follows. As is known, thermistors are devices having a resistance that varies with temperature. When the temperature within the portable computer varies, the resistance of the thermistor varies and accordingly, the voltage at the output 32 of the temperature detector 16 also varies. Therefore, the temperature detector provides an output voltage that is representative of temperature. In one embodiment of the present invention the thermistor is implemented using a thermistor coupled to a serial SMbus on a Pentium II mini cartridge.

The construction and operation of the controller 14 will now be described in greater detail. As shown in FIG. 1, the controller has a first input 14a coupled to the output of the temperature detector, a second input 14b coupled to the CPU 12, and an output 14c. In one embodiment, the controller includes an analog-to-digital converter that converts the analog voltage value received at input 14a to a digital value for comparison with a predetermined digital reference value. The digital reference value may be preset within the controller or set based on communications received from the CPU 12. The controller includes logic circuitry that conducts the comparison to determine a difference between the reference value with the value detected by the temperature detector and generates a control signal based on the difference. In embodiments of the present invention, the control signal may be a discrete logic signal that either turns the battery charging circuit on or off, or may be an analog or multiple value digital signal that sets the charge rate based on the magnitude of the difference detected.

In one embodiment of the present invention, the battery charging circuit is implemented using an LT 1511 battery charger available from Linear Technology Corporation, 1630 McCarthy Blvd., Milpitas, Calif., and the battery is implemented using a multiple cell lithium-ion battery, available from Sony. Lithium-ion batteries are charged according to a constant current mode followed by a constant voltage mode. The constant current mode is used until the battery voltage reaches a predetermined termination voltage value. During the constant current mode, the battery charging circuit dissipates a relatively large amount of heat, and it is during this mode that embodiments of the present invention are effective in reducing heat dissipation by reducing the charge rate of the battery.

The LT1511 battery charger, used in embodiments of the present invention, includes an IProg input to which an external signal can be applied to control the charge rate of the battery by controlling the magnitude of current supplied to the battery. In one embodiment of the present invention, the LT1511 is configured to set the magnitude of current using a pulse width modulation scheme whereby the pulse width of the signal from the controller to the battery charger is used to control the charge rate of the battery.

In embodiments described above, one temperature detector is used within a computer to detect the temperature at a critical location within the computer. In other embodiments of the present invention, more than one temperature detector may be used, and the charging rate of the battery may be reduced when a temperature detected by any one of the detectors is greater than the reference value, or when an average of all the detected temperatures is greater than the reference value. In another embodiment, each detector has its own corresponding reference value, and the charging rate of the battery is reduced when the temperature from any one of the detectors exceeds its reference value.

Charging control can also operate in concert with CPU throttling, allowing the computer to operate in warmer environments. Alternatively, the choice of temperature control modes could be user-defined.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A computer comprising:
   a battery;
   a battery charging circuit comprising:
     an output operatively connected to the battery; and
     a control input;
   a processor; and
   a temperature sensor to detect processor temperature at a location proximate to the processor, the temperature sensor being electrically coupled to the control input of the battery charging circuit.

2. The computer of claim 1 wherein the battery charging circuit is responsive to a control value of the control input to set a charging rate of the battery.

3. The computer of claim 1 wherein the temperature sensor detects the temperature of a central processing unit within the computer.

4. The computer of claim 1, wherein the battery charging circuit is constructed and arranged to reduce a charging rate of the charging circuit when a temperature detected by the temperature sensor exceeds a reference value.

5. The computer of claim 4, wherein a factor by which the charging rate is reduced is based upon a magnitude of a difference between the temperature detected and the reference value.

6. The computer of claim 5, wherein the battery charging circuit reduces the charging rate by reducing a magnitude of charge current supplied to the battery.

7. The computer of claim 6, wherein a pulse width of pulses contained within a control signal of the charging circuit determines the control value.

8. The computer of claim 1, wherein the battery charging circuit reduces the charging rate by reducing a magnitude of charge current supplied to the battery.

9. The computer of claim 1, wherein a pulse width of pulses contained within a control signal of the charging circuit determines the control value.

10. A method for controlling heat dissipation within a portable electronic device having a processor, a battery, and a battery charging circuit, the method comprising the acts of:
    charging the battery at a charging rate;
    detecting processor temperature at a location proximate to the processor within the portable electronic device;
    determining whether the temperature exceeds a reference value; and
    reducing the charging rate when the temperature exceeds the reference value.

11. The method of claim 10, wherein the step of determining includes a step of determining a magnitude of a difference between the temperature detected and the reference value, and wherein the step of reducing includes a step of reducing the charge rate by a factor based upon the magnitude of the difference between the temperature detected and the reference value.

12. The method of claim 11, wherein the step of reducing the charge rate includes a step of reducing a magnitude of a charge current from the charging circuit to the battery.

13. The method of claim 10, wherein the step of detecting includes a step of detecting a plurality of temperatures at a plurality of locations in the portable electronic device, and wherein the step of determining includes a step of determining whether any of the plurality of temperatures exceeds a corresponding reference value.

14. The method of claim 10, wherein the step of reducing the charge rate includes a step of reducing a magnitude of a charge current from the charging circuit to the battery.

15. The method of claim 10 further including the step of reducing a clock rate to components of the computer in response to a determination that the temperature exceeds a second reference value.

16. The method of claim 10, wherein:
    the step of detecting includes a step of detecting a plurality of temperatures at a plurality of locations in the portable electronic device;
    the step of determining includes a step of determining whether any of the plurality of temperatures exceeds a corresponding reference value; and
    the step of reducing the charge rate includes a step of reducing the charge rate when any of the plurality of temperatures exceeds the corresponding reference value.

17. A computer, comprising:
    a battery;
    means for charging the battery;
    means for detecting a temperature of a processor within the computer; and
    means for reducing a charging rate of the means for charging when the processor temperature exceeds a reference value.

18. The computer of claim 17, wherein the means for reducing the charging rate includes means for reducing a magnitude of a charge current from the battery charger to the battery.

19. The computer of claim 17, wherein the means for detecting a temperature of a processor is adapted to detect a plurality of temperatures at a plurality of locations in the computer, and wherein the means for reducing a charging rate comprises means for reducing power consumption when any of the plurality of temperatures exceeds a corresponding reference value.

* * * * *